United States Patent [19]

Trepus, Jr. et al.

[11] Patent Number: 4,707,206
[45] Date of Patent: Nov. 17, 1987

[54] METHOD OF MAKING A FIBER REINFORCED PRODUCT

[75] Inventors: George E. Trepus, Jr., Enumclaw; Barry D. Matin, Kent; Preston L. Rider, Kirkland, all of Wash.

[73] Assignee: The Boeing Company, Seattle, Wash.

[21] Appl. No.: 843,127

[22] Filed: Mar. 24, 1986

[51] Int. Cl.⁴ ............................................. B32B 31/20
[52] U.S. Cl. .................................... 156/187; 156/149; 156/244.13; 138/125; 138/126; 138/129; 138/137; 264/342 R; 264/347
[58] Field of Search .................... 156/149, 187, 244.13, 156/244.14, 85, 86; 264/209.6, 297.5, 347, 230, 342 R; 138/125, 126, 129, 137

[56] References Cited

U.S. PATENT DOCUMENTS

| | | | |
|---|---|---|---|
| 2,974,713 | 3/1961 | Hydrick | 156/149 |
| 3,414,448 | 12/1968 | Harpfer | 156/149 |
| 3,684,602 | 8/1972 | Ball | 156/244.13 |
| 4,061,704 | 12/1977 | Barter | 264/347 |
| 4,262,704 | 4/1981 | Grawey | 156/187 |
| 4,559,782 | 12/1985 | Ritchey et al. | 138/126 |

FOREIGN PATENT DOCUMENTS 1305893 2/1973 United Kingdom ................ 264/347

Primary Examiner—Caleb Weston
Attorney, Agent, or Firm—Christensen, O'Connor, Johnson & Kindness

[57] ABSTRACT

A method of manufacturing fiber reinforced silicone elastomer hoses and the hoses (25) resulting from the method are disclosed. The method comprises the step of extruding an unreinforced silicone elastomer inner tube (13) containing two vulcanizing agents having different activation temperatures. The extruded inner tube (13) is partially cured by heating the tube to the activation temperature of the lower temperture vulcanizing agent. The partially cured inner tube (13) is mounted on a mandrel (19) and wrapped with a fabric reinforced, calendered sheet (21) of uncured silicone elastomer containing a vulcanizing agent. External pressure is applied to the wrapped tube while the wrapped tube is heated to activate the second vulcanizing agent of the inner tube (13) and the vulcanizing agent of the wrapping sheet (21).

17 Claims, 6 Drawing Figures

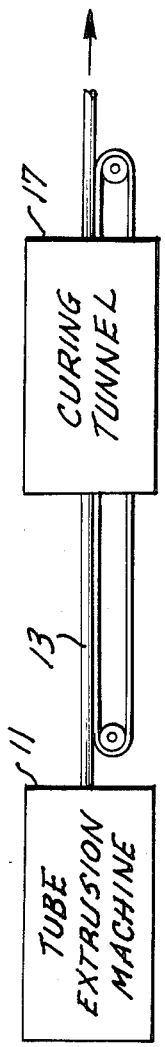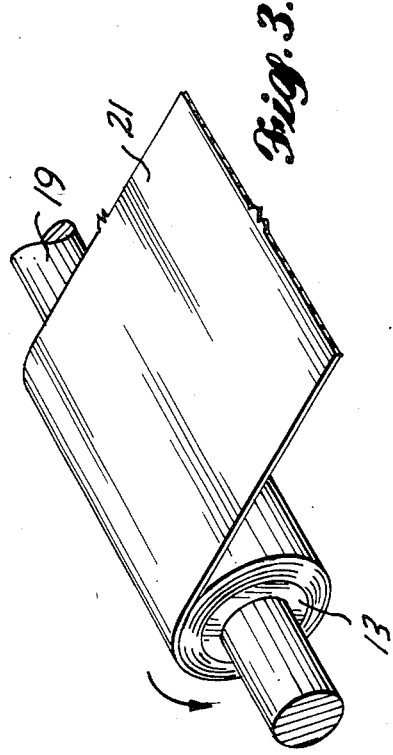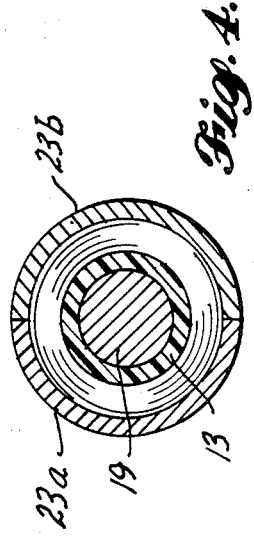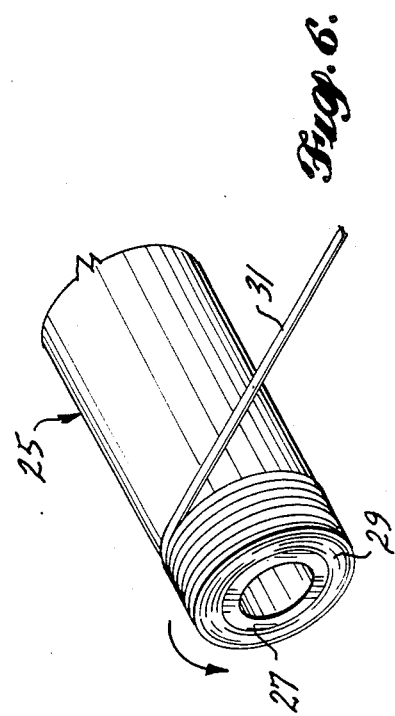

METHOD OF MAKING A FIBER REINFORCED PRODUCT

TECHNICAL AREA

This invention relates to hoses and more particularly silicone elastomer hoses.

BACKGROUND OF THE INVENTION

In the past, the vacuum hoses used with high temperature ovens and autoclaves have not been entirely satisfactory. One common hose used in this environment is formed by a Teflon tube enclosed by a braided metal sheath. In addition to being expensive to manufacture, the frequent flexing and twisting of such hoses that occurs when they are being used causes the metal sheath to become frayed and the Teflon tube to break or collapse. The breaking and/or collapsing of the Teflon tube results in a loss of vacuum. Frayed metal sheathing makes such hoses difficult to handle because the frayed metal is prone to cut the handler. One approach to strengthening braided metal sheathed Teflon tube hoses has been to include a metal coil spring inside the hose. Attempts to prevent fraying of the braided metal sheath involved coating the sheath with materials such as neoprene and vinyl materials. These materials were found to be unacceptable because they crack when exposed to high temperatures, resulting in the exposure and fraying of the braided metal sheath. A follow-up approach has been to enclose the hose with an external metal coil spring. While these additions improve hose wear resistance, they have made the resultant hoses more expensive and heavier. Further, the addition of strengthening coils does not eliminate other disadvantages of braided metal sheathed Teflon tube hoses. Specifically, the braided metal sheath of such hoses requires that the hose be swagged to connectors. Swagging is an expensive, time-consuming procedure. In addition, because metal has low thermal capacity and high thermal conductivity braided metal sheaths and protective metal coils store large amounts of heat when placed on an oven or autoclave. Because the metal sheaths and outer metal protective coils store large amounts of heat, braided metal sheathed Teflon hoses are difficult to handle immediately after removal from an oven or autoclave. They cause burns and become broken when the amount of stored heat causes them to be dropped.

One attempt to solve the foregoing problems involved creating a hose by spirally wrapping a fabric reinforced uncured silicone elastomeric sheet around a mandrel to form a tube and then, vulcanizing the elastomer. Such hoses were found to be unacceptable because the reinforcing fabric, which extended from the interior to the exterior of the hose, wicked and created a gas path via which vacuum is lost. In order to avoid this difficulty, the addition of a Teflon liner was proposed. While the Teflon liner avoided the vacuum loss problem, it created other problems. Specifically, flexing and twisting of the tube when in use resulted in the Teflon liner collapsing and breaking.

This invention is directed to providing fiber reinforced silicone elastomer hoses that avoid the foregoing disadvantages of prior hoses designed for use in ovens and autoclaves. While hoses formed in accordance with the invention were designed for use in ovens and autoclaves, it is to be understood that they can also be used in other environments.

SUMMARY OF THE INVENTION

In accordance with this invention, a method of manufacturing fiber reinforced silicone elastomer products, such as hoses, and the products resulting from the method are provided. In accordance with the method, a unreinforced silicone elastomer inner element, such as a tube, containing two vulcanizing agents having different activation temperatures is first extruded. The extruded inner tube is partially cured by heating the tube to the activation temperature of the lower temperature vulcanizing agent. The partially cured inner tube is then mounted on a mandrel and wrapped with a fabric reinforced, calendered sheet of uncured silicone elastomer containing a vulcanizing agent. External pressure is applied to the wrapped tube while the tube is heated to activate the second vulcanizing agent of the inner tube and the vulcanizing agent of the wrapping sheet.

In accordance with further aspects of this invention, preferably, the fabric part of the fabric reinforced calendered sheet of uncured silicone elastomer is an aromatic, polyamide fiber such as Nomex or Kevlar.

In accordance with other aspects of this invention, external pressure is applied to the wrapped tube by enclosing the wrapped tube in a layer of shrink wrap material prior to heating the tube to activate the second vulcanizing agent of the inner tube and the vulcanizing agent of the wrapping sheet.

In accordance with alternative aspects of this invention, external pressure is applied by clamping the wrapped tube between suitably shaped e.g., semicircular, jaws.

In accordance with still other aspects of this invention, prior to applying external pressure, the wrapped tube is overwrapped with a high density layer of high-strength fibers, such as polyamide fibers. The high density layer creates an outer armor layer, after pressure and heat is applied to activate the second vulcanizing agent of the inner tube and the vulcanizing agent of the overwrapping sheet.

As will be readily appreciated from the foregoing description, the invention overcomes the disadvantages of prior hoses designed for use with high temperature ovens and autoclaves. The use of an unreinforced silicone elastomer inner tube prevents vacuum loss as a result of fabric wicking. While the inner tube prevents vacuum loss, the resilience of silicone elastomer is such that the collapsing and breaking that occur when a Teflon liner is flexed does not occur. Further, because the thermal capacity and conductivity of silicone elastomers is lower, hoses formed in accordance with the invention do not store or transmit heat as readily as metal sheathed hoses. Hence, hoses formed in accordance with the invention can be handled without burning the skin of the handler at much higher autoclave temperatures than can metal sheathed hoses. Further, because silicone elastomers stretch, hoses formed of such elastomers are readily joined to connectors by providing the connectors with barbed ends designed to fit inside the ends of the hoses. If necessary, coupling pressure can be increased by adding outer clamps to such connectors.

BRIEF DESCRIPTION OF THE DRAWINGS

The foregoing and other advantages of the present invention will become more appreciated as the same becomes better understood by reference to the following detailed description when taken in conjunction with the accompanying drawings wherein:

FIG. 2 is a pictorial diagram illustrating the extrusion and first curing step of the process illustrated in FIG. 1;

FIG. 3 is a pictorial diagram illustrating the wrapping step of the process illustrated and described in FIG. 1;

FIG. 4 is a cross-sectional view illustrating an elastomer hose formed in accordance with the invention clamped and ready for use during the final curing step;

FIG. 5 is a pictorial diagram of a duplex cured fiber reinforced silicone elastomer hose formed in accordance with the invention; and, FIG. 6 is a pictorial diagram of an armored duplex cured fiber reinforced silicone elastomer hose formed in accordance with the invention.

DESCRIPTION OF THE PREFERRED EMBODIMENT

Figure 1:
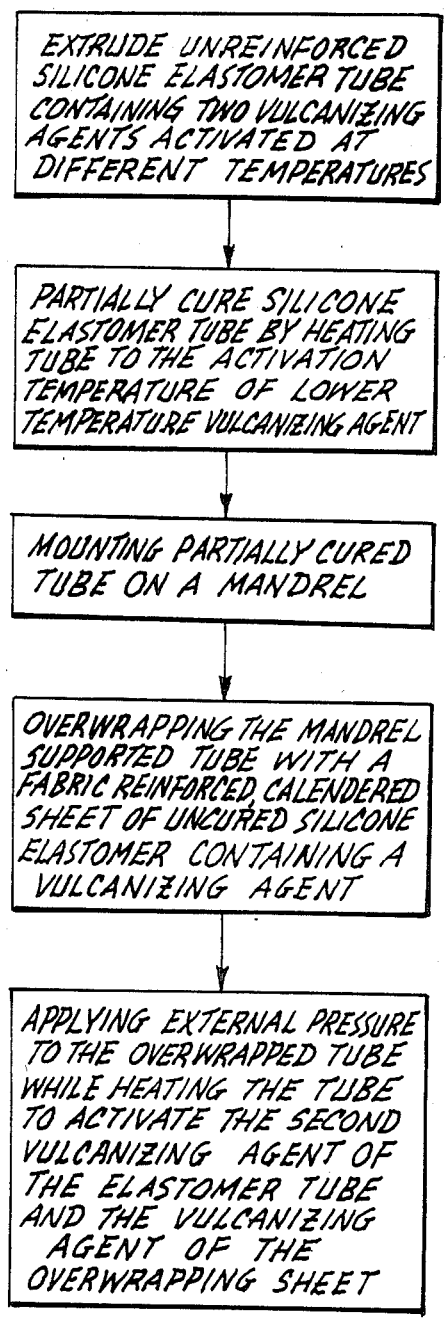
FIG. 1 is a flow diagram illustrating the major steps of a method of manufacturing fiber reinforced elastomer hoses in accordance with the invention.

FIG. 1 is a flow diagram that illustrates the inventive method of creating duplex cured elastomer hoses. The first step of the method is to extrude an unreinforced silicone elastomer inner tube. As shown in FIG. 2, the tube 13 may be extruded using a conventional tube extrusion machine 11. as will be readily appreciated by those skilled in the art, the plasticized state of extruded, unvulcanized silicone elastomer is such that the tube 13 is difficult if not impossible, to handle. Thus, as shown, the extruded tube is received by a conveyor 15 moving at the extrusion speed.

As is well known to those familiar with the processing of silicone elastomers, such elastomers include a peroxide vulcanizing agent. When the elastomer is heated to a suitable temperature, the peroxide decomposes and forms free radicals that react with organic groups in the silicone polymer. This results in cross-linkages between organic groups. The number and position of cross linkages determine the degree of vulcanization.

In accordance with the present invention, the unreinforced silicone elastomer inner tube 13 extruded by the tube extrusion machine 11 includes two vulcanizing agents having different activation temperatures. That is, one vulcanizing agent is activated at a lower temperature than the other vulcanizing agent. While various peroxide vulcanizing agents can be used, the presently preferred vulcanizing agents are: 2,4-dichlorobenzoyl peroxide and 2,5-dimethyl-2,5-(t-butylperoxy)hexane, which also is named 2,5-bis(tert-butylperoxy)-2,5-dimethyl-hexane. Other usable vulcanizing agents are: benzoyl peroxide, dicumyl peroxide, di-tertiary-butyl peroxide and tertiary-butyl perbenzoate. The major criteria to be observed when choosing the two vulcanizing agents to be used is that the activation temperature of the agents be separated by a substantial amount. In the case of the preferred vulcanizing agents, the first vulcanizing agent—2,4-dichlorobenzoyl peroxide—is activated at a temperature above 240° F. The second vulcanizing agent—2,5-dimethyl-2,5-di(t-butylperoxy)-hexane—is activated at a temperature above 320° F.

As illustrated in FIG. 1, the second step of the method of the invention is to partially cure the unreinforced silicone elastomer tube by heating the tube to the activation temperature of the lower temperature vulcanizing agent. While the tube can be, and preferably is, heated to a temperature above the minimum activation temperature of the lower temperature vulcanizing agent, the temperature must be below the minimum activation temperature of the higher temperature vulcanizing agent. As illustrated in FIG. 2, heating may be accomplished by conveying the extruded tube 13 through a curing tunnel 17. Preferably, the curing tunnel is a conventional hot liquid vulcanizing (HAV) unit. Alternatively, the curing tunnel could be a continuous hot liquid vulcanizing (HLV) unit. While still somewhat tacky, the partially cured silicone elastomer tube 13 exiting from the curing tunnel 17 can be manually handled.

As noted in the next step in FIG. 1, after exiting from the curing tunnel 17, the partially cured tube is mounted on a mandrel. Next, the mandrel supported tube is overwrapped with a fabric reinforced, calendered sheet of uncured silicone elastomer containing a vulcanizing agent. As shown in FIG. 3, the mandrel 19 may be spun to spirally wrap the reinforcing sheet about the tube 13. While various fiber reinforcing materials can be combined with uncured silicone elastomer to create the fabric reinforced, calendered sheet 21, the presently preferred fabric is an aromatic polyamide fiber, such as Nomex or Kevlar.

After a suitable number of layers of the fabric reinforced calendered sheet 21 are wrapped around the silicone elastomer inner tube 13, external pressure is applied to the overwrapped tube while the tube is heated to activate the second (e.g., higher temperature) vulcanizing agent of the inner tube 13 and the vulcanizing agent of the overwrapping sheet 21. One method of applying external pressure is to enclose the overwrapped sheet with a layer of shrink wrap material. As will be readily understood by those skilled in the art, when the shrink wrapped hose is placed in an oven, the shrink wrap material shrinks, resulting in pressure being applied to the overwrapped tube. Alternatively, as illustrated in FIG. 4, the overwrapped tube can be placed between a pair of semicircular jaws 23a and 23b. The jaws may form part of a heated mandrel, for example. Alternatively, the jaws may form part of a simple clamp assembly. Like with shrink wrapping, if a simple clamp assembly is used, the clamped hose must be placed in an oven so that the clamped assembly can be heated to activate the second vulcanizing agent of the inner tube 13 and the vulcanizing agent of the overwrapping sheet 21.

After the overwrapped tube has been heated to the required activation temperature for an adequate period of time, the clamps are removed, resulting in the formation of a duplex cured elastomer hose 25 having an unreinforced tubular center region 27 and a fiber reinforced outer region 29, as shown in FIG. 5. During vulcanizing, the free radicals formed by the decomposing peroxide that react with the organic groups in the silicone polymer create cross-linkages that attach the tube 27 to the silicone portion of the overwrapping layer 29. Further, the spirals of the overwrapping sheet 21 are joined via the silicone rubber. The end result is a homogenous silicone mass.

While it is necessary that the two vulcanizing agents included in the inner tube 13 have differing activation temperatures, no such requirement is placed on the vulcanizing agent included in the elastomer of the overwrapping sheet 21. The vulcanizing agent used in the overwrapping sheet 21 can be the same as either of the vulcanizing agents included in the inner tube. The lower temperature vulcanizing agent is acceptable because it will be activated at the higher temperature of the higher temperature vulcanizing agent, as well as at a lower temperature. Alternatively, the vulcanizing agent included in the overwrapping sheet 21 may be different than either of the vulcanizing agents included in the inner tube 13.

Because reinforcing fibers do not penetrate the tubular center region 27 of the resultant hose, the hose is vacuum tight. Further, because the hose is formed of silicone rubber and fiber the thermal capacity of the hose is lower than a hose containing metal. Thus, hoses formed in accordance with the invention can be handled without burning the handler at higher autoclave and oven temperatures than can metal reinforced hoses. Further, the nonmetallic reinforcing fibers of hoses formed in accordance with the invention are not subject to flex fatigue fracture as is the metal braiding of the type previously used with braided vacuum hoses designed for use with high temperature ovens and autoclaves. Thus, fraying is reduced while cut resistance remains high. Further, even if fraying occurs, the possibility of cutting persons handling hoses formed in accordance with the invention is low because nonmetallic reinforcing fibers are not as sharp as metal braiding.

If desired, after wrapping the tube 13 with the fiber reinforced, calendered sheet 21, the overwrapping sheet could be overwrapped with one or more layers of high density reinforcing fibers that create an outer armor when curing is finished. The outer armored layer may have minimal, if any, silicone rubber embedded in it. The layer can be provided by wrapping a woven sheet formed of suitable fibers about the overwrapped tube or by helically winding a fiber tape 31 about the outer surface of the overwrapped tube, as shown in FIG. 6.

As will be readily appreciated from the foregoing description, the invention provides a method of manufacturing fiber reinforced silicone elastomer hoses that are ideally suited for use with high temperature ovens and autoclaves. Hoses formed in accordance with the invention are not subject to the problems associated with prior art hoses utilized in such environments. Because they are formed of synthetic materials, their heat retention abililty is such that they are less likely to burn the hands of workers utilizing the tubes. In addition, they are more easily joined to connectors. For example, connectors with bayonet or barb hose terminals can be added to hoses formed in accordance with the invention by inserting the terminals into the interior of an end of the inner tube 13 of such hoses. If additional connecting pressure is desired, an outer clamp can be added to clamp the hose end to the inserted terminal.

While preferred embodiments of the invention have been illustrated and described, it will be appreciated that various changes can be made therein without departing from the spirit and scope of the invention. Rather than being a tube, the unreinforced extruded inner elastomeric element can take on some other form; an elongate inner element of a door seal, for example. After extrusion, in accordance with the invention, the element is partially vulcanized by heating the element to the activation temperature of a lower activation temperature vulcanizing agent. Then the element is wrapped with a fabric reinforced elastomeric layer and the assembly heated to cure the second vulcanizing agent of the inner element and the vulcanizing agent of the fabric reinforced elastomeric layer. Consequently, it is to be understood that the invention can be practiced otherwise than as specifically described herein.

The embodiments of the invention in which an exclusive property or privilege is claimed are defined as follows:

1. A method of manufacturing fiber reinforced silicone elastomer product comprising the steps of:
   (a) extruding an unreinforced silicone elastomer inner element containing two vulcanizing agents activated at different temperatures;
   (b) partially curing said silicone elastomer inner element by heating said element to a temperature at or above the activation temperature of the lower temperature vulcanizing agent but below the activation temperature of the higher temperature vulcanizing agent;
   (c) overwrapping said silicone elastomer inner element with a fabric reinforced, calendered sheet of uncured silicone elastomer containing a vulcanizing agent to create an overwrapped element; and,
   (d) applying external pressure to the overwrapped element while heating the overwrapped element to activate the second vulcanizing agent of the silicone elastomer inner element and the vulcanizing agent of the overwrapping sheet.

2. The method claimed in claim 1, wherein the fabric of said fabric reinforced, calendered sheet of uncured silicone elastomer is made of aromatic polyamide fibers.

3. The method claimed in claim 2, wherein said external pressure is applied by wrapping said element with a layer of material that shrinks when heated.

4. The method claimed in claim 2, wherein said external pressure is applied by clamping said overwrapped element between a pair of jaws.

5. The method claimed in claim 1, including the additional step of applying an outer layer of high density fabric to said overwrapped element prior to said step of applying pressure to said overwrapped element while heating the overwrapped element to activate the second vulcanizing agent of the silicone elastomer inner element and the vulcanizing agent of the overwrapping sheet.

6. The method claimed in claim 5, wherein the fabric of said fabric reinforced, calendered sheet of uncured silicone elastomer is made of aromatic polyamide fibers.

7. The method claimed in claim 6, wherein said external pressure is applied by wrapping said element with a layer of material that shrinks when heated.

8. The method claimed in claim 6, wherein said external pressure is applied by clamping said overwrapping element between a pair of jaws.

9. The method claimed in claim 1, wherein said inner element is a tube.

10. The method claimed in claim 9, including the step of mounting said inner tube on a mandrel prior to overwrapping said inner tube with said fabric reinforced, calendered sheet of uncured silicone elastomer.

11. The method claimed in claim 10, wherein the fabric of said fabric reinforced, calendered sheet of uncured silicone elastomer is made of aromatic polyamide fibers.

12. The method claimed in claim 11, wherein said external pressure is applied by wrapping said element with a layer of material that shrinks when heated.

13. The method claimed in claim 11, wherein said external pressure is applied by clamping said overwrapped element between a pair of jaws.

14. The method claimed in claim 10, including the additional step of applying an outer layer of high density fabric to said overwrapped element prior to said step of applying pressure to said overwrapped element while heating the overwrapped element to activate the second vulcanizing agent of the silicone elastomer inner element and the vulcanizing agent of the overwrapping sheet.

15. The method claimed in claim 14, wherein the fabric of said fabric reinforced, calendered sheet of uncured silicone elastomer is made of aromatic polyamide fibers.

16. The method claimed in claim 15, wherein said external pressure is applied by wrapping said element with a layer of material that shrinks when heated.

17. The method claimed in claim 15, wherein said external pressure is applied by clamping said overwrapped element between a pair of jaws.

* * * * *